United States Patent
Kobayashi

[19]

[11] Patent Number: 6,163,467
[45] Date of Patent: Dec. 19, 2000

[54] SWITCHING POWER SUPPLY FOR GENERATING DC VOLTAGE BY SYNCHRONOUS RECTIFICATION

[75] Inventor: Yasuhiro Kobayashi, Nagano, Japan

[73] Assignee: Nagano Japan Radio Co., Ltd., Nagano, Japan

[21] Appl. No.: 09/460,418

[22] Filed: Dec. 14, 1999

[51] Int. Cl.[7] .................................................. H02M 3/335
[52] U.S. Cl. ............................................. 363/20; 363/127
[58] Field of Search ............................... 363/200, 21, 127

[56] References Cited

U.S. PATENT DOCUMENTS

| | | | |
|---|---|---|---|
| 4,870,555 | 9/1989 | White ........................................ | 363/21 |
| 5,144,547 | 9/1992 | Masamoto ................................ | 363/127 |
| 5,734,563 | 3/1998 | Shinada .................................... | 363/21 |
| 5,742,491 | 4/1998 | Bowman et al. ........................ | 363/127 |
| 5,781,420 | 7/1998 | Xia et al. .................................. | 363/21 |
| 5,870,299 | 2/1999 | Rozman ................................... | 363/127 |
| 5,872,705 | 2/1999 | Loftus et al. ............................. | 363/21 |
| 5,946,207 | 8/1999 | Schoofs .................................... | 363/127 |
| 5,999,420 | 12/1999 | Aonuma et al. ......................... | 363/21 |
| 6,002,597 | 12/1999 | Rozman ................................... | 363/127 |
| 6,038,148 | 3/2000 | Farrington et al. ...................... | 363/21 |

*Primary Examiner*—Jeffrey Sterrett
*Attorney, Agent, or Firm*—Greenblum & Bernstein, P.L.C.

[57] ABSTRACT

A switching power supply of a synchronous rectification type is provided. A transformer has at least a primary winding and a secondary winding. A main switching element switches input DC current via the primary winding. An auxiliary switching element is arranged on a side of the secondary winding for use in conducting commutation current. The auxiliary switching element is turned on after the main switching element is turned off. The main switching element is turned on immediately after release of exciting energy from the transformer is completed.

5 Claims, 6 Drawing Sheets

SWITCHING POWER SUPPLY FOR GENERATING DC VOLTAGE BY SYNCHRONOUS RECTIFICATION

BACKGROUND OF THE INVENTION

1. Field of the Invention

This invention relates to a switching power supply for generating DC voltage by switching, and more particularly to a switching power supply which is suitable for use in generation of DC voltage by a so-called synchronous rectification.

2. Description of the Related Art

Figure 5:
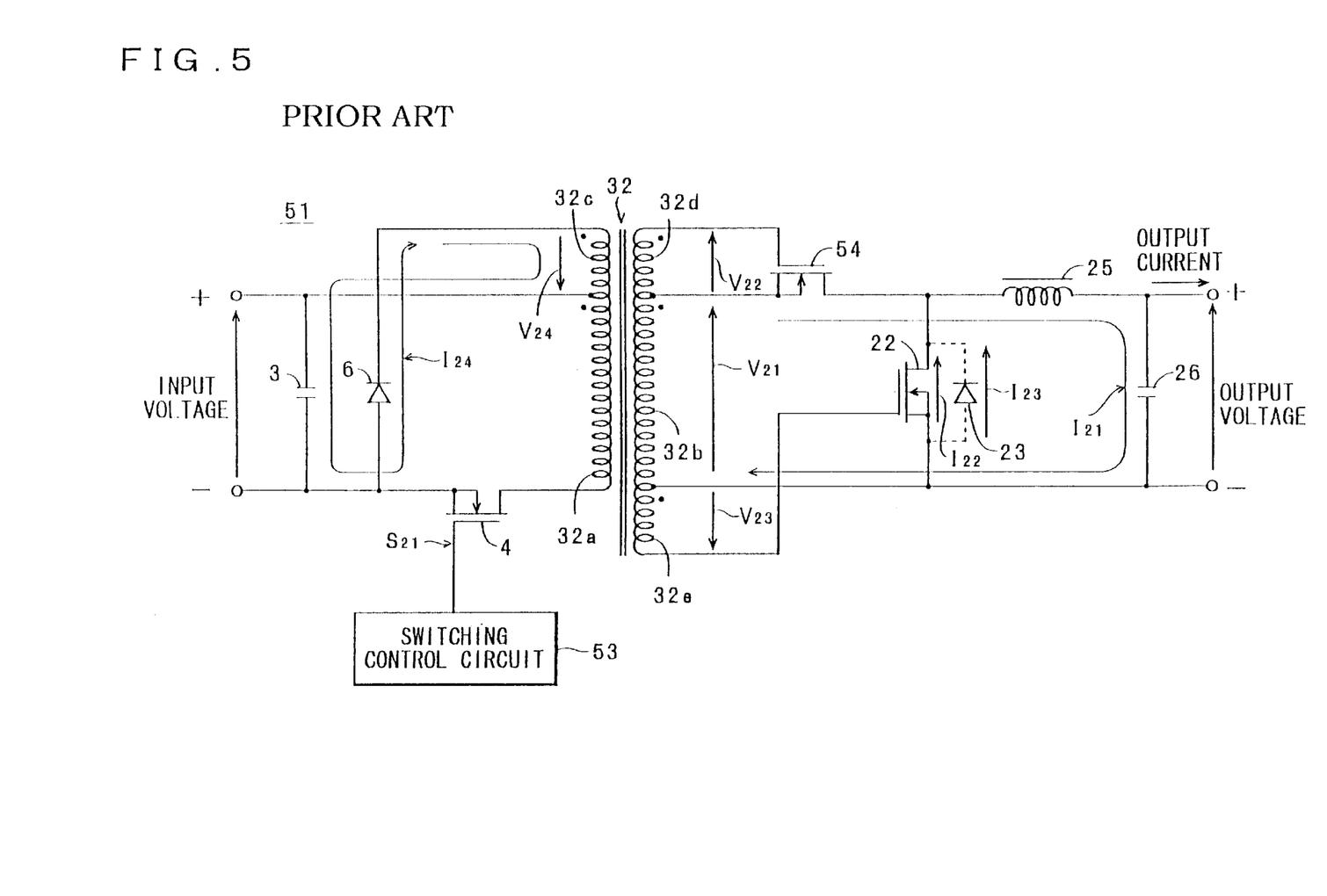
FIG. 5 is a diagram showing circuitry of a conventional power supply.

Conventionally, a forward-type power supply 51 shown in FIG. 5 is well known as a switching power supply of the above-mentioned kind. The power supply 51 is comprised of a transformer 32 for use in switching, a capacitor 3, an FET 4, a diode 6, a switching control circuit 53, an FET 22 for use in synchronous rectification which incorporates a diode 23 as a body diode, an FET 54 similarly for use in synchronous rectification, a choke coil 25, and a capacitor 26. The capacitor 3, the FET 4, the diode 6, and the switching control circuit 53 are arranged on the side of a primary winding 32a and a reset winding 32c of the transformer 32, while the FET 22, the FET 54, the choke coil 25, and the capacitor 26 are arranged on the side of a secondary winding 32b and auxiliary windings 32d and 32e of the transformer 32. In the power supply 51, the switching control circuit 53 delivers to the gate of the FET 4 a switching signal S21 which is a PWM (Pulse-Width Modulation) signal for regulating the voltage across the capacitor 26.

Figure 6A:
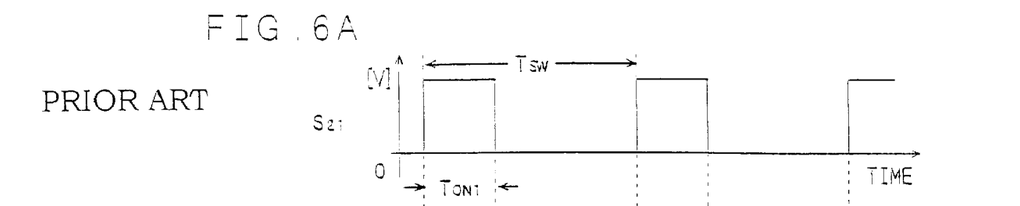
FIG. 6A is a diagram showing a signal waveform of a switching signal S21.
Figure 6B:
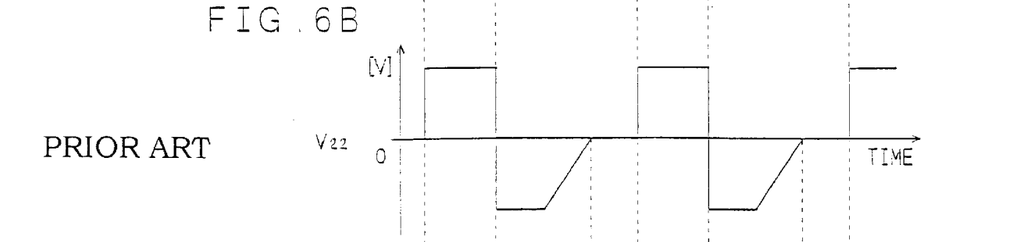
FIG. 6B is a diagram showing a voltage waveform of a voltage V22.

When the input voltage is supplied to the power supply 51, the switching control circuit 53 delivers to the gate of the FET 4 the switching signal S21 with a repetition period set to a constant time period TSW and a high-level period controlled to an ON time period TON1 dependent on the input voltage and the output current. When the switching signal S21 is at the high level, the FET 4 is held in an ON state, allowing a current to flow through the primary winding 32a, whereby voltages V21 and V22 directed as shown in FIG. 5 are generated in the secondary winding 32b and the auxiliary winding 32d, respectively (see FIG. 6B). As a result, the positive voltage V22 is applied between the gate and the source of the FET 54, whereby the FET 54 is turned on. Consequently, a current I21 flows in a direction shown in FIG. 5 through a current path of the secondary winding 32b, the FET 54, the choke coil 25, and the capacitor 26, whereby the capacitor 26 is charged, and at the same time an output current is supplied to a load circuit, not shown. In this state, the transformer 32 is magnetized according to a predetermined B-H curve by the current flowing through the primary winding 32a, whereby exciting energy is accumulated in the transformer 32.

Figure 6C:
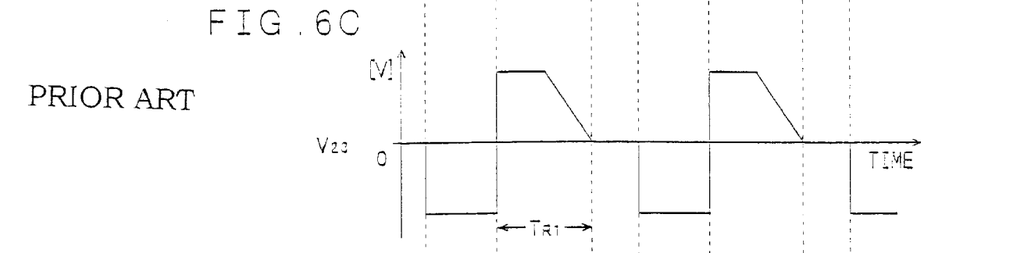
FIG. 6C is a diagram showing a voltage waveform of a voltage V23.
Figure 6D:
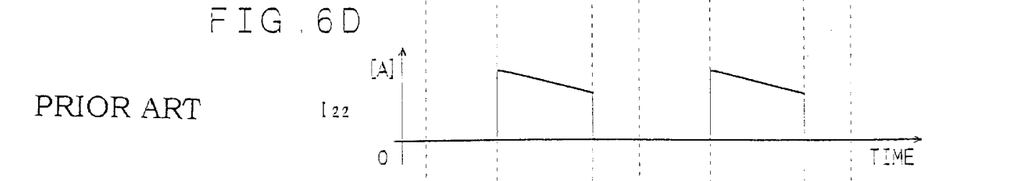
FIG. 6D is a diagram showing a current waveform of a free-wheeling current I22.

Subsequently, when the switching control circuit 53 changes the switching signal S21 from the high level to a low level, the FET 4 is turned off. At this time, the direction of the voltage V21 is reversed, so that the current I21 stops flowing. On the other hand, in the auxiliary winding 32e, a voltage V23 directed as shown in FIG. 5 is generated (see FIG. 6C), and the voltage V23,which is positive, is applied between the gate and the source of the FET 22, whereby the FET 22 is turned on. As a result, energy accumulated in the choke coil 25 causes a free-wheeling current I22 to flow through a current path of the choke coil 25, the capacitor 26, and the FET 22 (see FIG. 6D).

At the same time, a reset voltage V24 generated in the reset winding 32c causes a reset current I24 to flow in a direction shown in FIG. 5 through a current path of the reset winding 32c, the capacitor 3, and the diode 6, whereby the exciting energy accumulated in the transformer 32 is released from the same and regenerated in the capacitor 3. In this case, the reset voltage V24 is limited to a voltage value which is approximately equivalent to the input voltage.

Figure 6E:
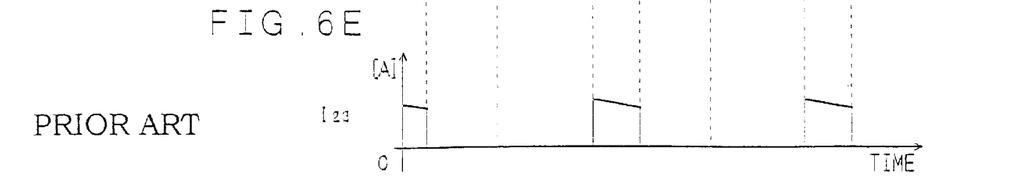
FIG. 6E is a diagram showing a current waveform of a free-wheeling current I23.

When a reset time period TR1 which is dependent on the input voltage, the ON time period TON1 of the FET 4, etc. has elapsed, the release of exciting energy accumulated in the transformer 32 is completed, and the transformer 32 is reset. In this state, the voltage V23 ceases to be generated (see FIG. 6C), so that the FET 22 is turned off. As a result, in place of the current path including the source and the drain of the FET 22, and a free-wheeling current I23 flows through a current path of the choke coil 25, the capacitor 26, and the diode 23 within the FET 22 (see FIG. 6E).

In this case, assuming that the FET 22 has an ON resistance of 20 mΩ between its drain and source, a forward voltage of a general rectifying diode is 0.7 V, and the output current is 10A, the FET 22 has an ON voltage of 0.2 V between its drain and source, and hence power loss by the FET 22 is smaller than power loss by a rectifying diode. Therefore, the use of the FET 22 in place of the rectifying diode improves conversion efficiency of the power supply 51.

When the switching control circuit 53 changes the switching signal S21 from the low level to the high level in the following switching period, the above operations are carried out again. As described above, according to this power supply 51, electric power transmitted to the secondary winding 32b by switching the FET 4 is rectified synchronously by the FETs 22 and 54, whereby the conversion efficiency of the power supply 51 is enhanced.

However, the conventional power supply 51 suffers from the following problem: When the input voltage is increased, for instance, the conversion efficiency of the device 51 is degraded. More specifically, in this power supply 51, it is required to provide the reset time period TR1 for resetting the transformer 32 whenever the time period TSW as the switching period elapses. The reset time period TR1 is dependent on the input voltage and the ON time period TON1 of the FET 4. For this reason, when the input voltage is low, the ON time period TON1 is increased, and since the reset voltage V24 is decreased, the reset time period TR1 is required to be increased. Therefore, in order to ensure that the reset time TR1 is set within each of the time periods TSW even when the input voltage is low, it is required to increase each of the time periods TSW to some extent. In other words, switching frequency is required to be reduced to some degree. On the other hand, when the input voltage is high, the ON time period TON1 is reduced, and since the reset voltage V24 is increased, the reset time period TR1 is required to be reduced. Therefore, a ratio of a time period over which the free-wheeling current I23 flows through the diode 22 to the time period TSW is increased. As a result, in the conventional power supply 51, when the input voltage is high, power loss by the diode 23 with a forward voltage of approximately 1V is increased, which makes it impossible to reduce power loss by the power supply 51 to an expected degree despite of use of the synchronous rectification.

SUMMARY OF THE INVENTION

It is an object of the invention to provide a power supply which is capable of enhancing conversion efficiency thereof without being adversely affected by variation in the input voltage.

To attain the above object, the present invention provides a switching power supply of a synchronous rectification type, including a transformer having at least a primary winding and a secondary winding, a main switching element for switching input DC current via the primary winding, and an auxiliary switching element arranged on a side of the secondary winding for use in conducting commutation current, the auxiliary switching element being turned on after the main switching element is turned off.

The switching power supply according to the invention is characterized in that the main switching element is turned on immediately after release of exciting energy from the transformer is completed.

Preferably, the switching power supply further includes detection means for detecting the completion of release of the exciting energy from the transformer, the main switching element being turned on when the detection means detects the completion of the release of the exciting energy.

More preferably, the detection means comprises a winding arranged in the transformer for use in the detection.

Preferably, the main switching element is turned on when a predetermined time period set to be longer than a time period between a time when the main switching element is turned off and a time when the release of the exciting energy is completed has elapsed after the main switching element was turned off.

The present disclosure relates to subject matter contained in Japanese Patent Application No. HEI 10-155231, filed on May 19, 1998, the disclosure of which is expressly incorporated herein by reference in its entirety.

The above and other objects, features, and advantages of the invention will become more apparent from the following detailed description taken in conjunction with the accompanying drawings.

DESCRIPTION OF THE PREFERRED EMBODIMENTS

Figure 1:
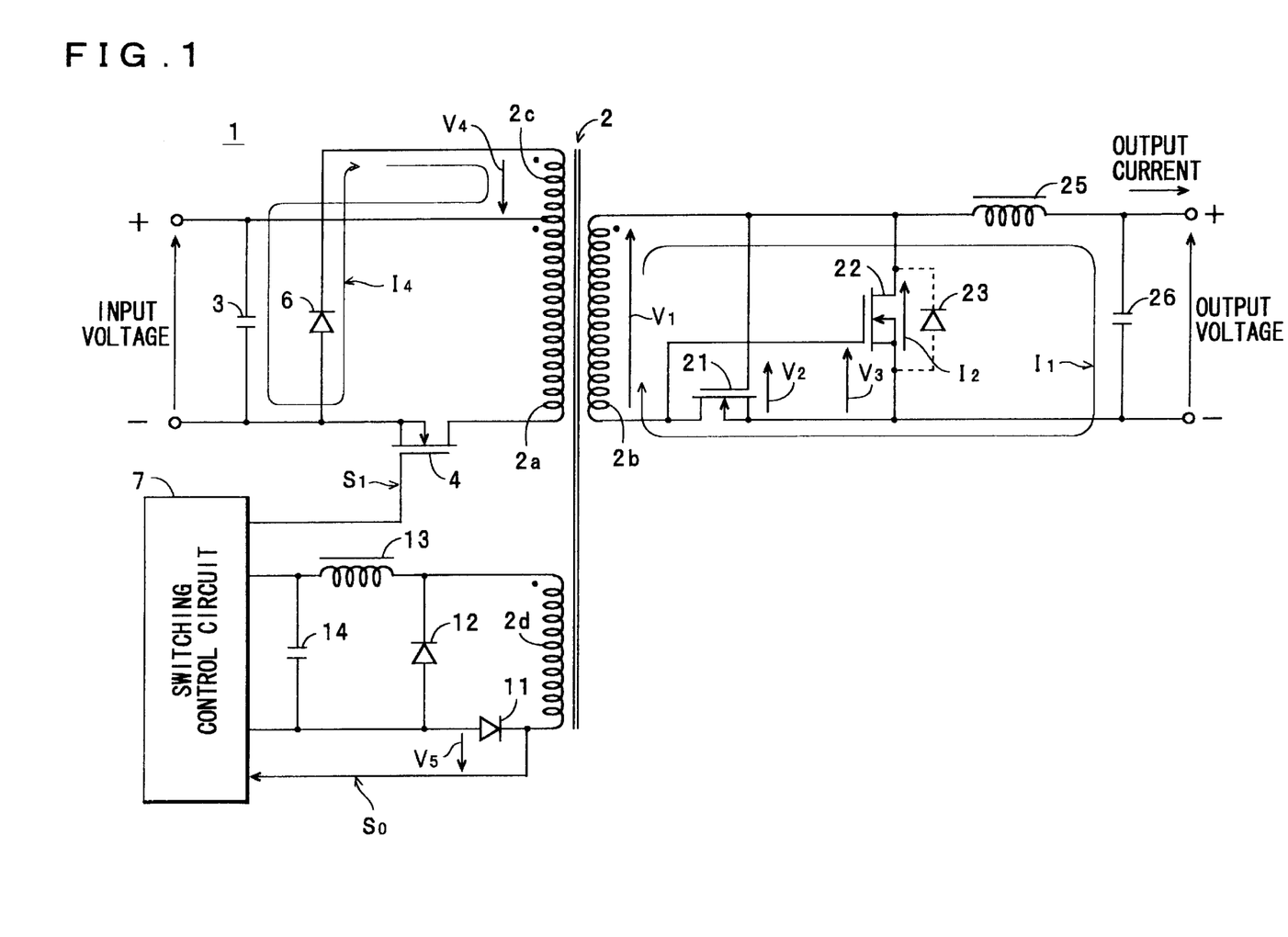
FIG. 1 is a diagram showing circuitry of a power supply according to a first embodiment of the invention.

The invention will now be described in detail with reference to the drawings showing preferred embodiments thereof. Referring first to FIG. 1, there is shown the circuitry of a switching power supply in the form of a forward type DC-DC converter, according to a first embodiment of the invention. The power supply 1 is comprised of a transformer 2 for use in switching, a capacitor 3, an FET 4 serving as a main switching element of the invention, a diode 6, a switching control circuit 7, diodes 11 and 12, a choke coil 13, and a capacitor 14. The capacitor 3, the FET 4, and the diode 6 are arranged on a side of a primary winding 2a and a reset winding 2c of the transformer 2, while the switching control circuit 7, the diodes 11 and 12, the choke coil 13, and the capacitor 14 are arranged on a side of an auxiliary winding 2d of the transformer 2, which serves as a winding for use in the detection, of the invention. In this embodiment, the switching control circuit 7 controls a switching signal S1 such that it is changed from a low level to a high level, when a voltage V5 between the cathode and anode of the diode 11 is decreased from a predetermined positive voltage to a voltage close to 0 V, and an ON time period TON of the switching signal S1 according to the input voltage and the output current.

Further, the power supply 1 has an FET 21, an FET 22 incorporating a diode 23 as a body diode and serving as an auxiliary switching element according to the invention, a choke coil 25, and a capacitor 26. The FET21, the FET 22, the choke coil 25, and the capacitor 26 are arranged on the side of a secondary winding 2b of the transformer 2.

Next, the overall operation of the power supply 1 will be described with reference to FIGS. 2A to 2F.

Figure 2A:
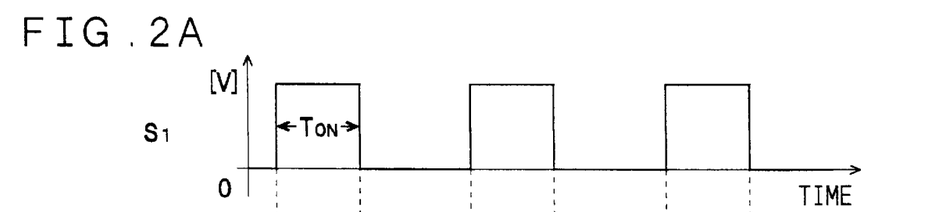
FIG. 2A is a diagram showing a signal waveform of a switching signal S1.

First, when the input voltage is supplied, the switching control circuit 7 is energized to deliver the switching signal S1 to the gate of the FET 4 (see FIG. 2A). In this case, the FET 4 switches the input voltage via the primary winding 2a to thereby induce an AC voltage in the auxiliary winding 2d. Then, the diodes 11 and 12, the choke coil 13, and the capacitor 14 rectify and smooth the AC voltage to generate a DC voltage. The DC voltage thus generated is supplied to the switching control circuit 7 to maintain the operation of the same.

Figure 2B:
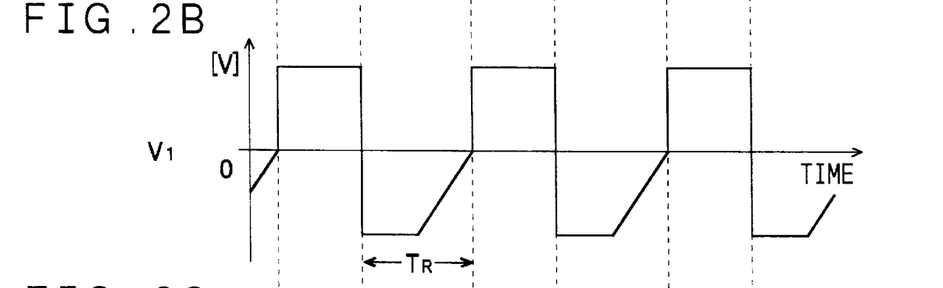
FIG. 2B is a diagram showing a voltage waveform of a voltage V1.
Figure 2C:
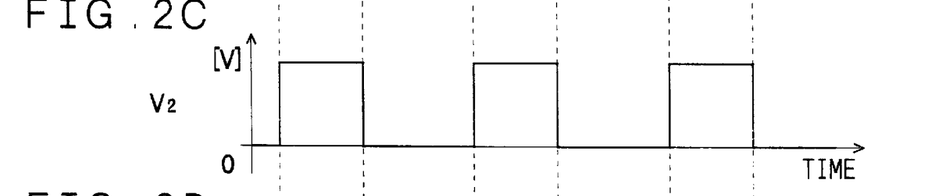
FIG. 2C is a diagram showing a voltage waveform of a voltage V2.
Figure 2D:
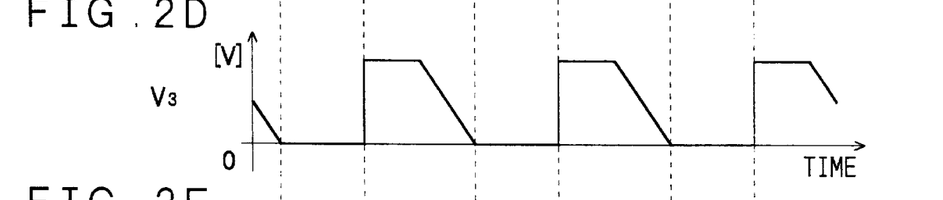
FIG. 2D is a diagram showing a voltage waveform of a voltage V3.

When the switching signal S1 is at the high level, the FET 4 is controlled such that it is in an ON state, whereby a voltage V1 directed as shown in FIG. 1 is induced in the secondary winding 2b (see FIG. 2B). At this time, a positive voltage V2 shown in FIG. 2C is applied between the gate and the source of the FET 21, whereby the FET 21 is turned on. As a result, a current I1 flows through a current path of the secondary winding 2b, the choke coil 25, the capacitor 26, and the source and the drain of the FET 21 to thereby charge the capacitor 26. In this state, the transformer 2 is magnetized according to a predetermined B-H curve by the current flowing through the primary winding 2a, whereby exciting energy is accumulated in the transformer 2.

Subsequently, when the switching control circuit 7 changes the switching signal Sl from the high level to the low level, the FET 4 is turned on. In this case, the voltage V1 is reversed in direction, and the voltage V2 becomes approximately equal to 0V. As a result, the FET 21 is turned off, whereby the current I1 stops flowing. On the other hand, the FET 22 is turned on by application of a voltage V3 (see FIG. 2D) directed as shown in FIG. 1 between its gate and source. This causes a free-wheeling current I2 to flow through a current path of the choke coil 25, the capacitor 26, and the FET 22.

Further, in this state, a reset current I4 directed as shown in FIG. 1 flows through a current path of the reset winding 2c, the capacitor 3, and the diode 6, by a reset voltage V4 induced in the reset winding 2c, whereby the exciting energy accumulated in the transformer 2 is released from the same and regenerated in the capacitor 3.

Figure 2E:
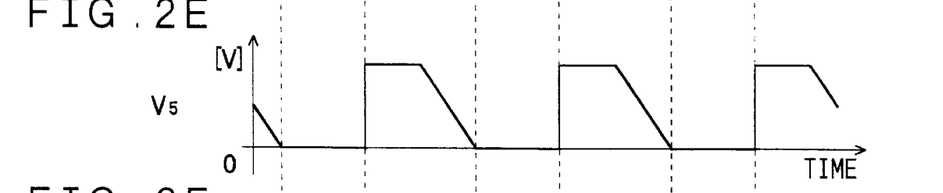
FIG. 2E is a diagram showing a voltage waveform of a voltage V5.
Figure 2F:
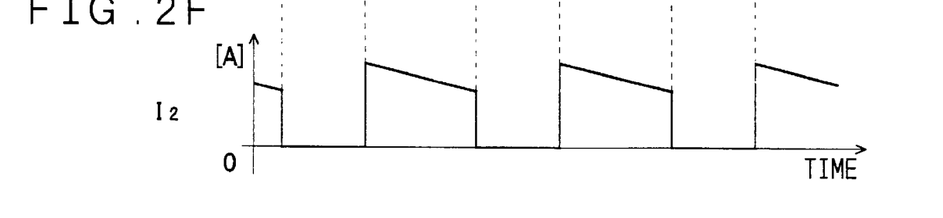
FIG. 2F is a diagram showing a current waveform of a free-wheeling current I2.

When the release of the exciting energy from the transformer 2 is completed, there is no voltage generated in any winding of the transformer 2. At this time, the voltage V3 is decreased from a predetermined voltage to a voltage close to 0 V (see FIG. 2D), whereby the FET 22 is turned off. This forces the free-wheeling current I2 which was flowing through the FET 22 to flow through the diode 23 instead of flowing through the FET 22. Further, simultaneously, the voltage V5 also falls from a predetermined voltage to a voltage close to 0 V as shown in FIG. 2E, so that when the switching control circuit 7 receives a voltage detection signal S0 indicative of the voltage V5, it determines that the transformer 2 is completely reset, and changes the switching signal S1 from the low level to the high level. As a result, the FET 4 is turned on, and the voltage V1 directed as shown in FIG. 1 is generated in the secondary winding 2b, whereby the FET 21 is turned on again. Consequently, the free-wheeling current I2 ceases to flow through the diode 23 but starts to flow through the current path of the secondary winding 2b, the choke coil 25, the capacitor 26, and the source and the drain of the FET 21, together with the current I1 dependent on the voltage V1.

In this case, even if a rest time period TR, shown in FIG. 2B, for resetting the transformer 2 is short due to a high input voltage, the switching control circuit 7 detects from the voltage detection signal S0 that the voltage V5 has reached a value close to 0 V, thereby reliably determining that the release of the exciting energy from the transformer 2 is complete, and turning on the FET 4, based on the determination immediately thereafter. Therefore, the free-wheeling current I2 hardly flows through the diode 23, whereby power loss by the diode 23 is sharply reduced, which makes it possible to enhance conversion efficiency of the power supply 1 without being adversely affected by variation in the input voltage. Further, since the auxiliary winding 2d for detecting the completion of the release of exciting energy from the transformer 2 also serves as a winding of an auxiliary power supply for the switching control circuit 7, it is possible to construct detection means for detecting the completion of the release of exciting energy, at a low cost.

Figure 3:
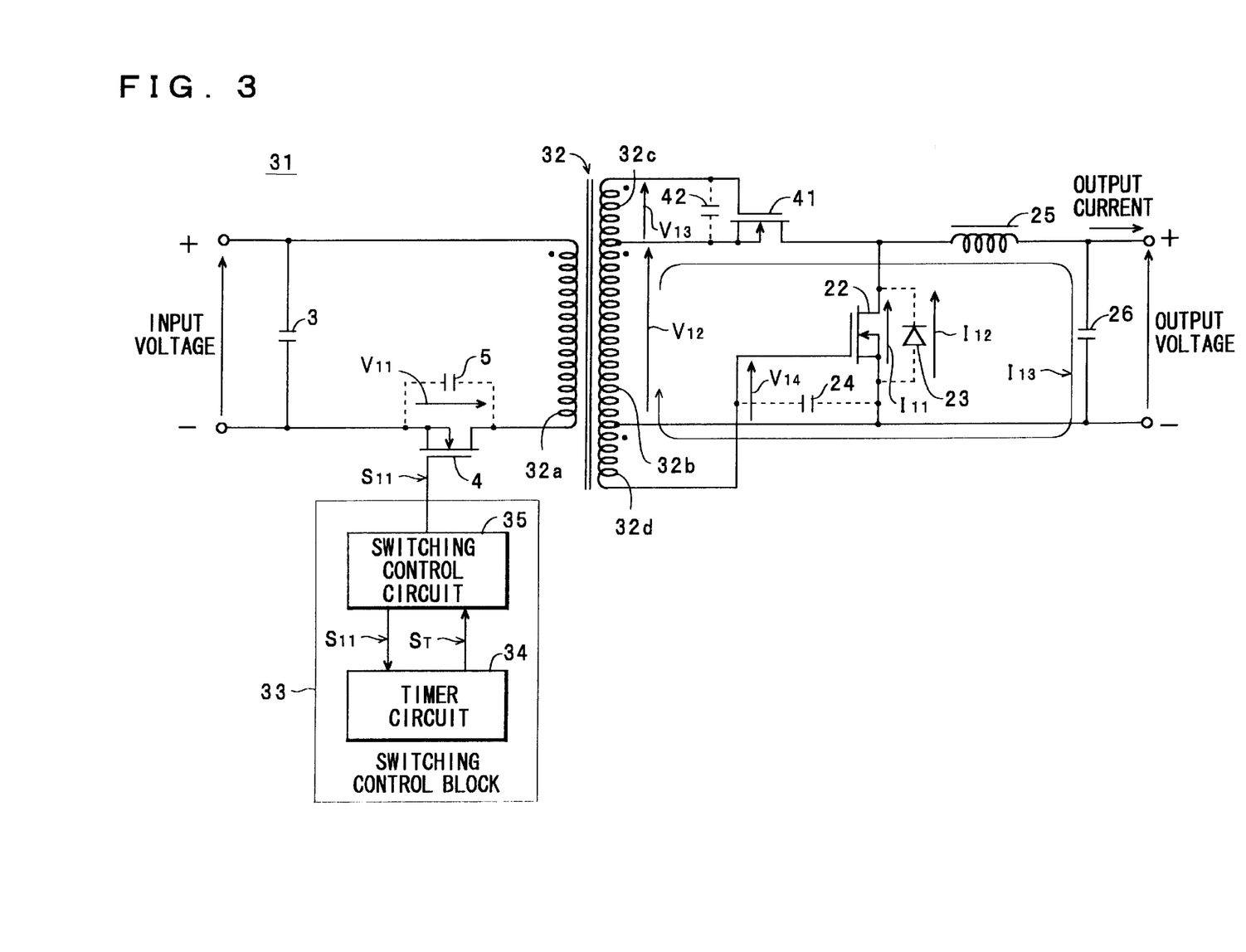
FIG. 3 is a diagram showing circuitry of a power supply according to a second embodiment of the invention.

Next, a power supply 31 according to a second embodiment of the invention will be described with reference to FIG. 3. Component parts and elements similar to those of the power supply 1 are designated by identical reference numerals, and detailed description thereof is omitted. Further, description of operations of the power supply 31 similar to those of the power supplies 1 is omitted, and mainly, differences therebetween are described.

The power supply 31 is distinguished from the power supply 1 in that the diode 6 is removed to omit the reset circuit and a transformer 32, a switching control block 33, and FET 41 are provided in place of the transformer 2, the switching control circuit 7, and the FET 21 of the power supply 1. The switching control circuit 33 includes a timer circuit 34 and a switching control circuit 35. In this embodiment, assuming that the sum of a capacity of a parasitic capacitor 42 arranged between the gate and the source of the FET 41 and a capacity of a parasitic capacitor 24 arranged between the gate and the source of the FET 22, which are calculated as respective capacities on the side of the primary winding 32a, and a capacity of a parasitic capacitor 5 arranged between the drain and the source of an FET 4 is represented by C, and an exciting inductance of the transformer 32 by LR, a reset time period T1 for the transformer 32 is expressed by the following equation (1). As can be understood from the equation (1), the reset time period T1 is independent of the input voltage. Therefore, even if the input voltage varies, the reset time period T1 is always held constant. On the other hand, the timer circuit 34 delivers a timer signal ST to the switching control circuit 35 when an OFF time period TOFF which is preset to a time period lightly longer than the reset time period T1 has elapsed after a switching signal S11 was changed from a high level to a low level.

$$T1 = \pi \times (LR \times C)^{0.5} \qquad (1)$$

In this case, the switching control circuit 35 changes the switching signal S11 from the low level to the high level when the timer signal ST is delivered thereto from the timer circuit 34. As a result, the switching signal S11 is controlled to have one repetition period comprised of the OFF time period TOFF fixedly set as the time period which is slightly longer than the reset time period T1 and an ON time period which varies in length in dependence on the input voltage and the output voltage. Thus, the switching control circuit 35 controls ON/OFF states of the FET 4 by both the PWM method and the PFM (Pulse Frequency Modulation) method.

Figure 4A:
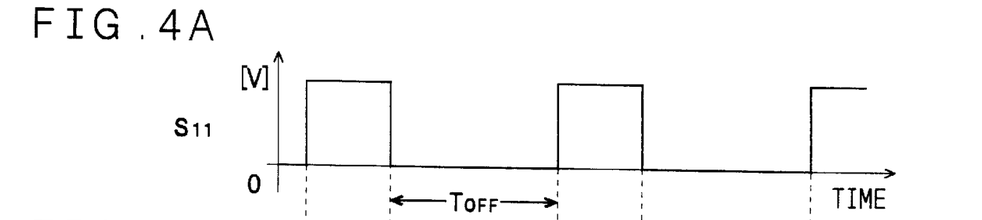
FIG. 4A is a diagram showing a signal waveform of a switching signal S11.
Figure 4B:
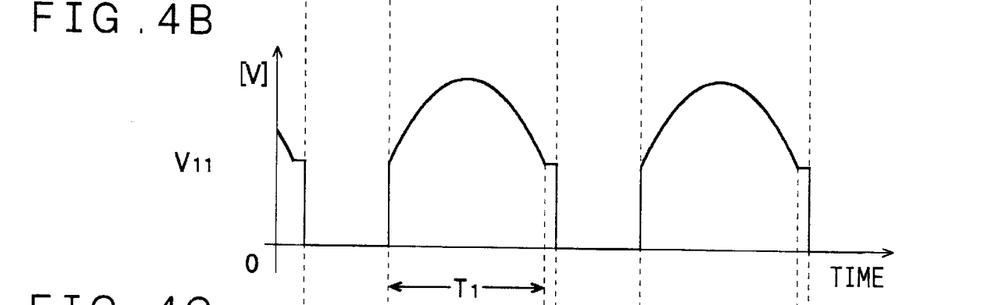
FIG. 4B is a diagram showing a voltage waveform of a voltage V11.

In the power supply 31, when the switching control circuit 35 changes the switching signal S11 shown in FIG. 4A from the high level to the low level, the FET 4 is controlled to be switched from the ON state to the OFF state. At this time, a voltage V11 between the drain and the source of the FET 4 changes as shown in FIG. 4B due to series resonance produced by the exciting inductance of the transformer 32 and the parasitic capacitors 5, 24, and 42. Further, at this time, release of exciting energy accumulated in the transformer 32 starts.

Figure 4C:
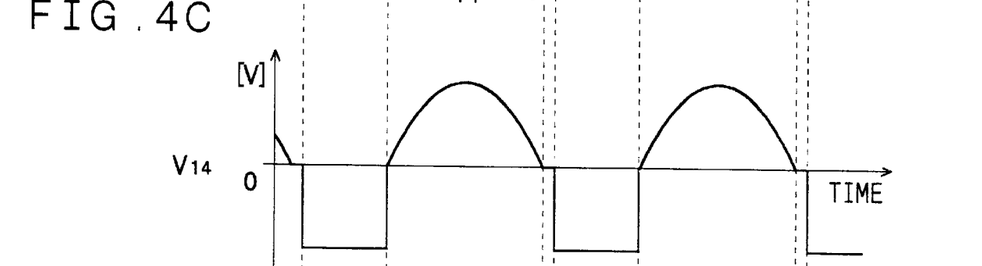
FIG. 4C is a diagram showing a voltage waveform of a voltage V14.
Figure 4D:
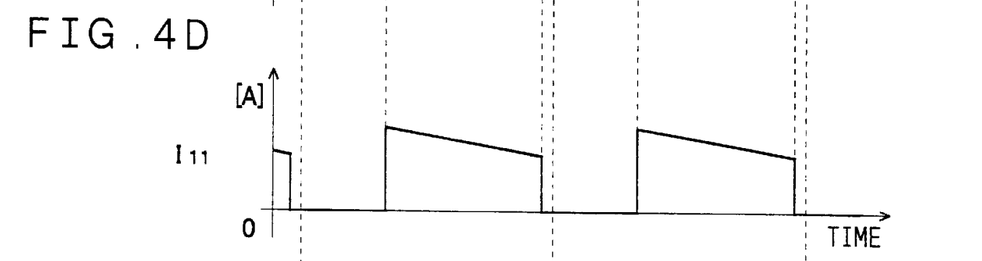
FIG. 4D is a diagram showing a current waveform of a free-wheeling current I11.
Figure 4E:
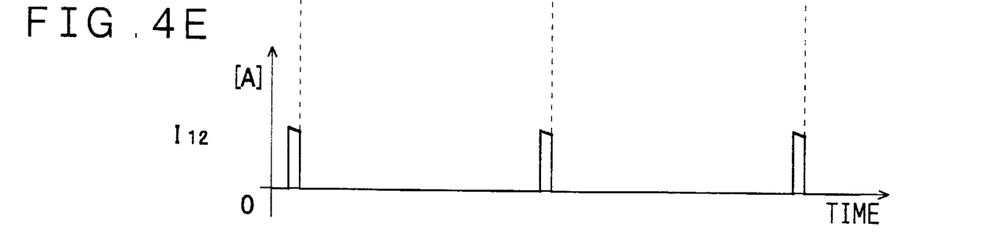
FIG. 4E is a diagram showing a current waveform of a free-wheeling current I12.

When the FET 4 is turned off, a voltage V14 shown in FIG. 4C is induced in an auxiliary winding 32d, and the voltage V14, which is positive, is applied between the gate and the source of the FET 22. As a result, the FET 22 is turned on, whereby a free-wheeling current I11 shown in FIG. 4D flows through a current path of a choke coil 25, a capacitor 26, and the FET 22. Then, when the reset time period T1 has elapsed after the FET 4 was turned off, the release of exciting energy from the transformer 32 is completed. At this time, the voltage V14 becomes approximately equal to 0 V, which causes the FET 22 to turn off. Accordingly, a free-wheeling current I12 shown in FIG. 4E flows through a current path of the choke coil 25, the capacitor 26, and a diode 23 within the FET 22 in place of the current path including the source and the drain of the FET 22.

On the other hand, the timer circuit 34 delivers the timer signal ST to the switching control circuit 35 immediately after the OFF time period has elapsed after the switching signal S11 was changed to the low level, i.e. immediately after the reset time period T1 elapsed and the free-wheeling current I12 started to flow. When the switching control circuit 35 receives the timer signal ST from the timer circuit 34, it changes the switching signal S11 from the low level to the high level, whereby the FET 4 is immediately turned on. As a result, voltages V12 and V13 directed as shown in FIG. 3 are generated in a secondary winding 32b and an auxiliary winding 32c, respectively. This causes the free-wheeling current I12 to stop flowing, and instead, a current I13 starts to flow through a current path of the secondary winding 32b, the FET 41, the choke coil 25, and the capacitor 26. Thereafter, when the switching signal S11 is changed from the high level to the low level, the above operations are performed again.

As described above, in the operations of the power supply 31, the reset time period T1 and the OFF time period TOFF are held constant irrespective of variation in the input voltage. Therefore, the switching control circuit 35 controls the FET 4 such that it is turned on immediately after the free-wheeling current I12 starts to flow, even when the input voltage varies. Therefore, by setting the OFF time period of the switching signal S11 to be approximately equal to but slightly longer than the reset time period T1, power loss caused by the free-wheeling current I12 flowing through the diode 23 can be sharply reduced. Thus, conversion efficiency of the power supply 31 can be improved without being adversely affected by variation in the input voltage. Further, in the power supply 31, it is not required to provide the reset circuit including the reset winding 2c and the diode 6 so as to release the exciting energy from the transformer 32, which makes it possible to produce the power supply 31 with ease in a simplified construction and at a low cost.

It should be noted that the present invention is not limited to the above embodiments, but the construction thereof can be modified as required. For example, although the power supply 1 according to the first embodiment of the invention has the diode 11 arranged on the side of a wind-terminating end of the auxiliary winding 2d, this is not limitative, but the diode 11 may be arranged on the side of a wind-starting end of the same. In this case, by detecting a voltage between the wind-starting end and the wind-terminating end of the auxiliary winding 2d, it is possible to determine more accurately that the release of exciting energy from the transformer 2 is completed.

Further, although in the power supply 1, the exciting energy accumulated in the transformer 2 is released by the use of the diode 6, this is not limitative, but e.g. a so-called CRD clamp circuit (clamp circuit comprised of a capacitor, a resistance, and a diode) may be employed to release the exciting energy.

Moreover, although in the power supply 1, the FETs 21 and 22 are driven by the voltage generated in the secondary winding 2b, this is not limitative either, but an auxiliary winding may be provided in the transformer 2 similarly to the power supply 31, and synchronous rectification may be performed by driving the FETs 21 and 22 by a voltage generated in the auxilary winding.

It is further understood by those skilled in the art that the foregoing is a preferred embodiment of the invention, and that various changes and modifications may be made without departing from the scope thereof.

What is claimed is:

1. A switching power supply of a synchronous rectification type, said switching power supply comprising:

a transformer having at least a primary winding and a secondary winding;

a main switching element for switching DC current input via said primary winding;

an auxiliary switching element arranged on a side of said secondary winding, said auxiliary switching element conducting a commutation current, said auxiliary switching element being turned on after said main switching element is turned off, and a detection device which comprises a winding provided in said transformer and which detects a completion of release of exciting energy from said transformer, wherein said main switching element is turned on when said detection device detects said completion of the release of exciting energy.

2. The switching power supply according to claim 1, said transformer further comprising a reset winding.

3. A switching power supply of a synchronous rectification type, said switching power supply comprising:

a transformer having at least a primary winding and a secondary winding;

a main switching element that switches DC current input via said primary winding;

an auxiliary switching element arranged on a side of said secondary winding, said auxiliary switching element conducting commutation current, said auxiliary switching element being turned on after said main switching element is turned off; and a timer circuit that delivers a timer signal upon elapse of a predetermined time period after said main switching element is turned off, said predetermined time period being set to be longer than a time period between a turn-off time of said main switching element and completion of a release of exciting energy of said transformer;

wherein said main switching element is turned on when the timer signal is delivered by said timer circuit after said main switching element is turned off.

4. The switching power supply according to claim 3, wherein said time period between the turn-off time of said main switching element and the completion time of a release of exciting energy of said transformer is independent of an input voltage.

5. The switching power supply according to claim 3, wherein the time period TI, between the turn-off time of the main switching element and the completion of release of the exciting voltage of the transformer is defined by the following relationship:

$$TI = \pi \times (LR \times C)^{0.5}$$

where LR is the exciting inductance of the transformer and C is a capacity of a capacitor of the main switching element.

* * * * *